Patented June 21, 1938

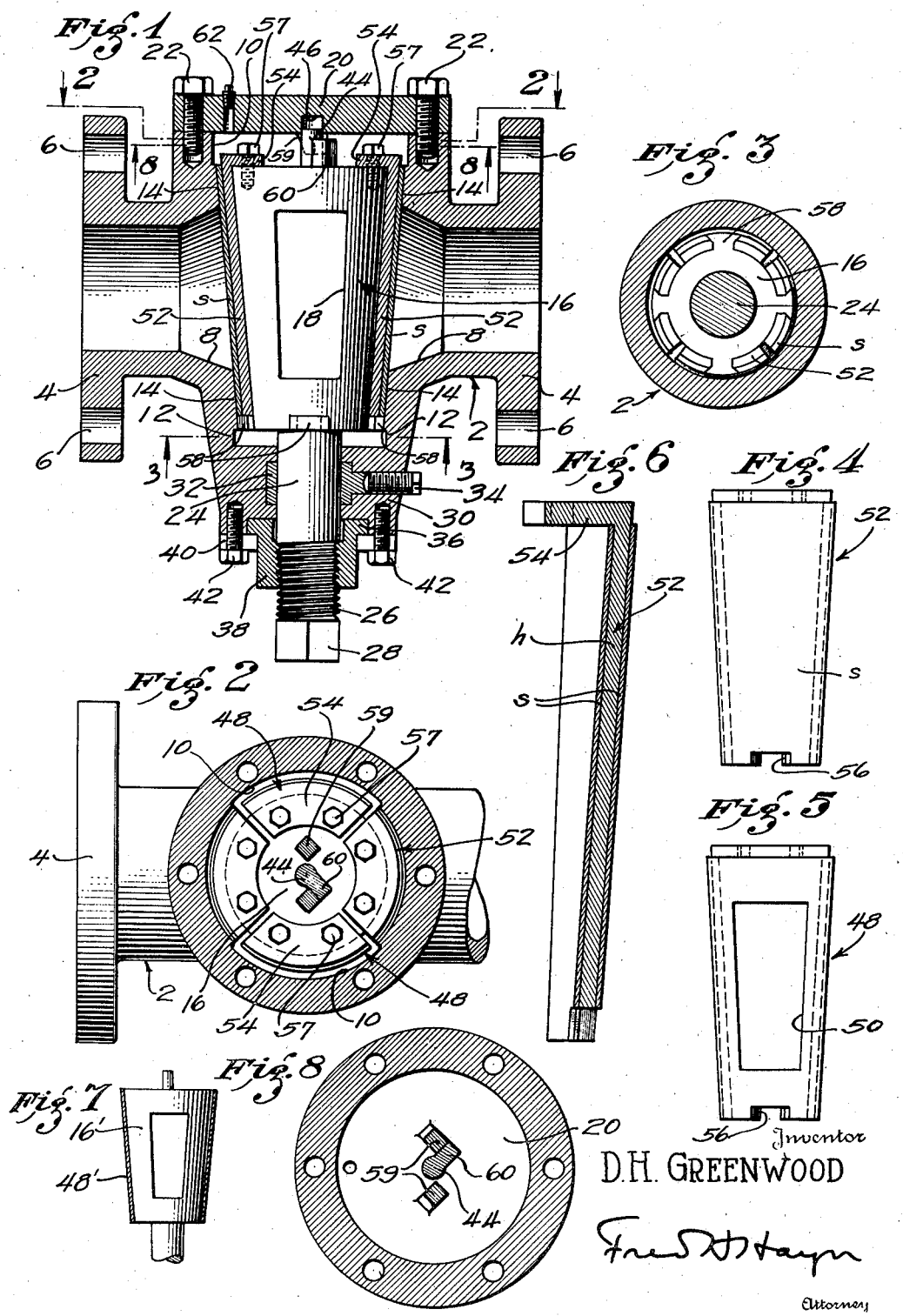

2,121,031

UNITED STATES PATENT OFFICE 2,121,031

VALVE CONSTRUCTION

Dolphice H. Greenwood, Los Angeles, Calif.

Application September 10, 1934, Serial No. 743,429

9 Claims. (Cl. 251—103)

My invention relates to valve constructions, and more particularly to those in which it is possible to gain access to the valves for certain purposes without disturbing the fluid pressure conditions in the valve casings, and irrespective of whether or not the fluid line in which said constructions are associated has been closed.

With the known type or types of valves in the art to which my invention falls, especially those used in practice, such as gate valves, globe valves, stop cocks, and the like, due to their construction, it is impossible to gain access thereto for the purpose of replacement, repair, or for other purposes, and more particularly when fluid pressure conditions are being maintained in the line with which said valves are associated. If such valves leak after they have been closed or shut off, it is necessary to renew those parts thereof which are not holding the pressure, and invariably it is compulsory to shut down the pipe line, remove the defective valve and replace the same with a new one or one capable of accomplishing the purposes intended. Obviously, such a proceeding is an expensive one in that not only new valves are usually required, but the delay caused by shutting off the pipe line insures excessive loss of time with its resulting monetary and other losses.

By the use of my invention all such deleterious results are effectively overcome.

It accordingly is an object of my invention to provide a novel form of valve construction in which it is possible to gain access thereto for the purpose of repair, inspection and/or removal or replacement of the various parts, irrespective of pressure conditions therein or whether or not the pipe line supplying the fluid thereto is closed or shut down.

Another object of my invention is to provide an indicating means, such as a suitable bleeder valve, associated with my novel form of valve construction, so that positive indications may be had at all times, as to the working conditions of the valve, and whether or not any leakage is had.

It is also an object of my invention to provide a novel form of valve construction having inwardly projecting valve seats juxtaposed to the valve plug operable in the valve casing of said construction, said valve seats being defined by providing said casing with hollowed out portions, said hollowed out portions being adapted to permit the removal of certain of a plurality of valve inserts detachably associated with said valve plug, irrespective of the fluid pressure conditions in said casing.

It is also within the province of my invention to provide a novel form of valve construction having a novel valve lifting and valve seating means, a means for holding said valve suspended while it is being operated, and a novel stop means for insuring that said valve will be in closed position, when turned, say through an arc of substantially 90°.

It is also within the province of my invention to provide a novel form of valve plug having associated with its outer surface a seating material of soft composition molded or otherwise positioned thereon, or provide said surface with a set of detachable inserts or packing means, which may comprise a relatively hard internal material, which may be of a suitable composition or otherwise, and with a relatively softer or substantially pliant exterior material or composition upon one or both sides of said inserts, molded or otherwise associated with said relatively hard internal material.

The above and further objects and advantages of my invention, as will hereinafter more fully appear, I attain by the construction described in the specification and illustrated on the drawing, forming a part of my application.

Reference is had to the accompanying drawing, in which similar reference characters denote similar parts. In the drawing, Fig. 1 is a cross-sectional view of my invention, the valve being shown in closed position, Fig. 2 is a cross-sectional view, taken on the line 2—2, Fig. 1, looking in the direction of the arrows, Fig. 3 is a similar view, taken on the line 3—3, Fig. 1, also looking in the direction of the arrows, Fig. 4 is an elevational view of one of the valve closing inserts, Fig. 5 is a similar view of one of the valve opening inserts, Fig. 6 is a cross-sectional view of an insert illustrating a composition insert constructed of relatively hard and soft or pliant materials, Fig. 7 is a fragmentary cross-sectional view, upon a reduced scale, of a modified form of valve plug in which soft or pliant material may be positioned on the exterior surface thereof, and Fig. 8 is a bottom plan view also on a reduced scale, of the valve cap or cover, illustrating the valve stop means.

Describing my invention more in detail, the industry is demanding a valve construction, including especially and more particularly a valve of the stop cock type that may be closed with a positive and effective shut off, and principally a novel structure whereby the seat of the valve, when worn or ineffective, may be renewed or replaced, without the necessity of removing the valve casing or plug from the valve casing, or the valve construction from the pipe line, thus accomplishing a marked saving in time and resultant expense.

To this end I may provide a suitable valve casing or construction 2, which may be equipped with inlet and outlet flanges 4, provided with the usual openings 6, whereby said construction 2, may be detachably associated with a pipe line through which any fluid may be passed, and which construction may be used not only to control the flow of said fluid, but also to shut down or close the flow of said fluid whenever such is demanded and needed in practice.

The casing 2 is preferably cut out or cut away as at 8, 10 and 12 to provide suitable inwardly extending projections or valve seats 14, adapted to be engaged by the valve or valve plug, designated generally by the reference numeral 16, and which valve or valve plug may be any in practice preferred, and may be tapered as shown in the drawing, and provided with a through passage 18, Fig. 1, more particularly.

As seen in Fig. 1, the valve construction 2 may be provided with a suitable valve cap or cover 20, provided with any desired means, such as the screw bolts 22, whereby said cap or cover may be held in secured and detachable relation with the casing or valve construction 2, for a purpose presently to be described.

Associated in any way in practice preferred with the valve or plug 16 is a suitable valve stem 24, which stem may be provided with threads 26, and a suitable manipulating means 28, adapted to be engaged by a suitable implement, such as a wrench, for a purpose also presently to be described.

As seen more particularly in Fig. 1, the valve casing 2 may be provided with a suitable extension 30, bored or otherwise formed, as shown, to receive the valve stem 24, and also to receive any preferred form of packing means 32, which may be made adjustable by any desired means, such as a suitable set screw 34, to provide a means for packing said stem 24.

As will also be seen in Fig. 1, the extension 30 may also be bored or otherwise provided with a recess to receive the flange 36 of a suitable internally threaded means or nut 38, the exterior of which is also adapted to be engaged by a suitable implement, such as a wrench, to turn the same, said internal threads being adapted to engage and coact with the threads 26 of the stem 24, also for a purpose presently to be explained. Moreover, the nut 38 and its flange 36 may be held in position by any suitable means, such as the ring 40, which may be held in detachable relation with the extension 30 by any suitable means, such as the screw bolts 42, said nut and its flange being capable of being turned in said recess, as will be presently explained.

At the other end of the valve or plug 16, opposite to the stem 24, said valve may be provided with a suitable centering pin, projection or means 44, adapted to engage in a complementary recess or depression 46 in the valve cap or cover 20, so that as said valve or plug is lifted from its seat, said pin or projection will move in and be guided by said recess or depression, the purpose of which will also be hereinafter more particularly set forth.

To pack the valve or plug 16 against leakage, to renew or replace said packing means, to insure that said packing is efficient and effective, and to provide a means whereby ineffective or worn parts may be renewed or replaced, irrespective of working conditions or fluid pressure conditions in the valve construction 2, a wide variety of structural features may be employed.

If desired, I may provide the exterior surface of the valve plug 16 with suitable cut out portions for receiving the packing means, or said packing means may be associated with said plug in any manner in practice preferred.

In Figs. 1-3 inclusive I have shown an especially effective and efficient packing means, which packing means may be removed or replaced, even though fluid pressure conditions are maintained in the casing 2, and without disturbing such.

The packing means disclosed in Figs. 1-3 may comprise a set or plurality of valve or plug inserts, preferably four in number, and may comprise two fluid pressure inserts 48, each provided with fluid pressure openings 50 (Fig. 5), both identical in construction, and two fluid pressure shut off or closing inserts 52, also both identical in construction. See Fig. 4, more particularly. Except for the opening 50, both sets of inserts in the form of my invention are identical.

If preferred, one end of each of the inserts 48 and 52 may be provided with suitable flanges 54, which flanges may be secured to the valve or plug 16 by any suitable means, such as the screw bolts 56 (Fig. 1) whereby said inserts may be held in detachable relation with said valve or plug.

Each end of each of the inserts 48 and 52 may be provided with suitable slots, cut out portions or securing means 56, and which may be flared as shown to engage a suitable complementary means, such as the headed bosses or knobs 58, associated in any preferred way and at any suitable point or points with the exterior surface of the valve or plug 16, so that said inserts may be slipped over said bosses or knobs, so that said inserts may be held in secured and detachable relation with said valve or valve plug, and by removing the screw bolts 56 said inserts may be readily removed from said valve or plug, by first removing the cover or cap 20, even though fluid pressure conditions still exist while this is being done, as will be hereinafter more particularly explained.

The inserts 48 and 52 may be constructed of any preferred material, hard or soft or pliant, composition or other material. As seen more particularly in Fig. 6, the internal portion of said inserts may be constructed of a relatively hard material $h$ and a relatively or comparatively soft material $s$ upon the exterior thereof, said materials being associated in any manner in practice preferred, such, for example, as by molding or otherwise.

It will also be clear that I do not desire to be limited to the provision of detachable inserts, such as just described, but may provide the exterior surface of the valve or plug with a suitable packing, which may be permanently associated therewith, and by any preferred means or method; renewal or replacement being accomplished by bodily removing the valve or plug from the valve casing or valve construction 2.

Such a structure is more particularly shown in Fig. 7 in which the valve or plug 16' may be provided on its surface by the packing 48' which may be of composition, soft or pliant, or otherwise, and may be molded thereon or otherwise associated therewith, as in practice preferred.

As seen in Figs. 1 and 8, the bottom or inner side of the valve cap or cover 20 may be provided with a suitable stop means 59, either integral with said cap or cover, or associated therewith as in practice preferred, said stop means being of such a nature as to insure the full and complete closing of the valve or plug 16 upon a quarter turn thereof, or through an arc of substantially 90°. To coact with said stop means, the valve or plug 16 or the pin 44 may be provided with a complementary stop means 60, at all times overlapping said stop means 59, irrespective of the position of said valve or plug or its pin 44, so that a complete closure of said valve or plug is assured after being moved through said turn or arc.

In operation, assuming that the valve or plug 16 has been in operation for a considerable period of time, the opening 18 being in alignment with the fluid pressure in the casing 2, and it is desired that said valve or plug be closed or shut off, an implement, such as a wrench is first applied to the flanged nut 38, turning said nut to the left in Fig. 1, the threads 26 having a direction contrary to those on the interior of said nut. This action will cause the stem 24, and, of course, the valve 16, to be lifted, since the flange 36 by means of the ring 40 is held in position (except that it may be turned), thus lifting said valve or plug from its seat. The valve or plug 16 is then turned through substantially an arc of 90°, as previously explained, by applying an implement, such as a wrench, to the nut or turning means 28, and turning said nut and valve or valve plug to the right in Fig. 1, thus closing the valve.

To ascertain whether or not the closure of the valve or plug 16 is perfect, the cap or cover 20 may be provided with a suitable indicating means 62, which may be any preferred form of bleeder valve, and said valve is opened. If no pressure flow is had through said valve, then, obviously, there is no leakage, and the valve is sealed.

Assuming that the valve seats, inserts and the like are worn, or do not hold the fluid pressure, and it is desired to replace or renew the same, the valve or plug 16 is returned to seating or open position by reversing the process just described. The two closure or shut off inserts 52 now project into the cut out portions 10 (see Figs. 1 and 2). The cap or cover 20 is now removed, and the cap screws or screw bolts 56 are then removed, and the ineffective inserts are simply withdrawn through the casing 2 and are replaced by new ones, after which the cap or cover 20 is replaced, and the valve or plug 16 returned to its seat as previously explained, and all this is accomplished without interfering with the pressure conditions in the casing 2. If new port inserts 48 are required, renewal thereof may be accomplished in a similar manner. There is no necessity whatever of removing the valve construction 2 from the pipe line. Moreover, as the valve 16 is being lifted, it is centered by means of the pin 44, and said valve is held in suspension and accurately centered so said valve or plug may be accurately returned to its seat.

In accordance with the provisions of the patent statutes, I have described the principle of operation of my invention together with the construction which I now consider to represent the best embodiment thereof; but I desire to have it understood that the construction shown is only illustrative, and that the invention can be carried out by other means.

I claim as my invention:

1. In a valve construction, a casing, a valve plug operable in said casing, a set of valve inserts detachably mounted upon the lateral surface of said plug, means for detachably securing said inserts to the top of said plug, and means associated with said casing and said plug, whereby said plug may be given a 90° turn to shut off the fluid pressure in said casing and certain of said inserts removed from said plug without shutting off the fluid pressure in said casing.

2. In a valve construction, a casing, a valve plug operable in said casing, a plurality of valve plug inserts detachably connected to said valve plug, said casing being provided with hollowed out portions juxtaposed to said valve plug to provide inwardly projecting valve seat portions on said casing, and a detachable valve cap for said casing, said hollowed out portions being adapted to permit the removal and replacement of said inserts irrespective of fluid pressure conditions in said casing.

3. A valve comprising a casing having ports, a rotary valve plug in the casing, said valve plug carrying detachable members adapted to be positioned in operative positions against the interior of the valve casing opposite the ports or on rotation of the plug in inoperative positions, said valve casing having a removable wall enabling the detachable members when in inoperative positions to be removed and replaced while the plug remains in the valve casing, the valve casing presenting an interior surface having a clearance around the detachable members when the detachable members are in inoperative positions.

4. A valve comprising a casing having ports, a tapered rotary valve plug in the casing, said valve plug carrying and being partly formed by detachable members adapted to be positioned in operative positions against the interior of the valve casing opposite the ports or on rotation of the plug in inoperative positions, said valve casing having a removable wall enabling the detachable members when in inoperative positions to be removed and replaced while the plug remains in the valve casing, and means for unseating or reseating the plug in the direction of its small end.

5. A detachable and replaceable member for the plugs of rotary plug valves comprising a segmental member presenting an outer surface to conform to the seat for the plug, the arcuate length of the member being only a portion of the circumference of the plug, said segment having slip preventing means at one end providing for attachment to and detachment from the plug body.

6. A detachable and replaceable member for the plugs of rotary plug valves comprising a segmental member presenting an outer surface to conform to the seat for the plug, the arcuate length of the member being only a portion of the circumference of the plug, said segment having slip preventing means at one end providing for attachment to and detachment from the plug body, the inner and outer surfaces of said segment being formed of readily deformable material so that these surfaces may be caused to conform to the seating surface for the plug and the plug body.

7. A rotary plug valve comprising a casing having opposed ports, a passaged and tapered rotary valve plug in the casing, said valve plug carrying at least two detachable members arranged so that when one member is in operative position against the interior of the valve casing opposite a port the other member will be in an inoperative position remote from the port, means adjacent the small end of the plug for forcing the plug axially to unseat the plug for turning and to reseat, the valve casing having a removable wall adjacent the large end of the plug whereby on removal of the wall that detachable member which is in inoperative position may be removed and replaced while the plug remains in the casing.

8. In a valve construction, a casing, a valve plug operable in said casing, a set of valve inserts detachably mounted upon the lateral surface of the said plug, means for detachably securing the inserts to the plug to prevent longitudinal or circumferential slipping of said inserts and means associated with said casing and the plug whereby said plug may be given a turn to shut off the fluid pressure in said casing and certain of said inserts removed from said plug without shutting off the fluid pressure in said casing.

9. In a valve construction, as claimed in claim 8, the said valve plug being tapered, the casing having a space in alignment with an insert to be removed whereby the insert may be removed from the plug through the said space.

DOLPHICE H. GREENWOOD.